United States Patent
Kim et al.

(10) Patent No.: US 8,442,065 B2
(45) Date of Patent: May 14, 2013

(54) APPARATUS AND METHOD FOR SUPPORTING QUALITY OF SERVICE IN WIDEBAND WIRELESS COMMUNICATION SYSTEM USING MULTIPLE FREQUENCY ALLOCATIONS

(75) Inventors: Nam-Gi Kim, Suwon-si (KR); Jae-Hee Cho, Seoul (KR); Hyoung-Kyu Lim, Seoul (KR); Min-Hee Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 958 days.

(21) Appl. No.: 12/050,416

(22) Filed: Mar. 18, 2008

(65) Prior Publication Data

US 2008/0232267 A1    Sep. 25, 2008

(30) Foreign Application Priority Data

Mar. 21, 2007  (KR) .................. 10-2007-0027511

(51) Int. Cl.
 *H04J 3/16*  (2006.01)
(52) U.S. Cl.
 USPC ........... 370/437; 370/436; 370/431; 370/462; 370/458
(58) Field of Classification Search .................. 370/252, 370/437, 436, 462, 458
 See application file for complete search history.

(56) References Cited

U.S. PATENT DOCUMENTS

| | | | |
|---|---|---|---|
| 6,721,282 B2 * | 4/2004 | Motley | 370/252 |
| 6,816,500 B1 * | 11/2004 | Mannette et al. | 370/431 |
| 2003/0054851 A1 * | 3/2003 | Jo et al. | 455/522 |
| 2005/0197133 A1 | 9/2005 | Hong et al. | |
| 2006/0013182 A1 * | 1/2006 | Balasubramanian et al. | 370/343 |
| 2006/0120282 A1 * | 6/2006 | Carlson et al. | 370/229 |
| 2006/0121898 A1 * | 6/2006 | Kim et al. | 455/435.1 |
| 2008/0318609 A1 * | 12/2008 | Sung | 455/509 |

FOREIGN PATENT DOCUMENTS

| | | |
|---|---|---|
| KR | 1020020067445 | 8/2002 |
| KR | 1020050135493 | 12/2005 |
| KR | 1020060130352 | 12/2006 |

* cited by examiner

*Primary Examiner* — Huy D Vu
*Assistant Examiner* — Omer Mian
(74) *Attorney, Agent, or Firm* — The Farrell Law Firm, P.C.

(57) ABSTRACT

An apparatus and method for supporting Quality of Service (QoS) in a wideband wireless communication system using multiple Frequency Allocations (FAs) are provided. In a transmitting method for packet distribution in the wideband wireless communication system, the method includes, during a network entry process, determining a number of FAs through multi-FA capability negotiation; distributing packets, received from a superordinate layer, through the multiple FAs; and transmitting the packets distributed through the multiple FAs. Accordingly, packets can be effectively distributed through multiple FAs, and QoS can be effectively provided.

19 Claims, 11 Drawing Sheets

APPARATUS AND METHOD FOR SUPPORTING QUALITY OF SERVICE IN WIDEBAND WIRELESS COMMUNICATION SYSTEM USING MULTIPLE FREQUENCY ALLOCATIONS

PRIORITY

This application claims priority under 35 U.S.C. §119(a) to a Korean patent application filed in the Korean Intellectual Property Office on Mar. 21, 2007 and assigned Serial No. 2007-27511, the entire disclosure of which is incorporated herein by reference.

BACKGROUND OF THE INVENTION

1. Field of the Invention

The present invention relates generally to an apparatus and method for supporting Quality of Service (QoS) in a wideband wireless communication system, and in particular, to an apparatus and method for supporting packet distribution and QoS in a wideband wireless communication system using multiple Frequency Allocations (FAs).

2. Description of the Related Art

Mobile communication technologies are expected to achieve high-speed data communication in order to satisfy future demands of mobile communication users. To this end, high-speed data communication must be supported in a wireless link. A wide bandwidth is required to provide the high-speed data communication in the wireless link, while a time occupied by one symbol becomes significantly short. When one symbol is transmitted along two different paths, a time for delivering the symbol may vary since multiple paths exist in the wireless link. A signal, which includes one symbol and is delivered along a relatively longer path, causes interference to a signal that includes a next symbol and is delivered along a shorter path. Such an Inter-Symbol Interference (ISI) becomes more significant when faster data communication is provided in the wireless link. To address this problem, an Orthogonal Frequency Division Multiplexing (OFDM) technique is used in which a frequency band is divided into several sub-channels, and data streams are separately transmitted through the respective sub-channels.

Meanwhile, a standard or a similar protocol is being modified so that a communication system evolves, to provide a high-speed data service compared to a legacy system, or to address an implementation issue. In such a system evolution process, various systems may be present together in the same area according to a compatibility level with respect to the legacy system. For example, a new system, which uses a Frequency Allocation (FA) of 20 MHz and is further evolved from the legacy system using an FA of 10 MHz, may be installed in an area where an OFDM-based wideband wireless communication system (e.g., an Institute of Electrical and Electronics Engineers (IEEE) 802.16e system) is installed. The conventional wideband wireless communication system supports only Mobile Stations (MSs) that have a single bandwidth for one FA. That is, the legacy system using the FA of 10 MHz has a structure that can support only MSs using an FA of 10 MHz. Therefore, in order to support a new MS having a greater bandwidth, such as an MS using an FA of 20 MHz, a new FA having a bandwidth of 20 MHz is necessary. However, with the advent of a ubiquitous information age, available frequency bandwidth has become insufficient, and therefore, it is difficult to allocate a new frequency bandwidth in order to support both the legacy system and the new system.

Accordingly, research on a frequency overlay technique, which uses a conventional multi-FA method without allocating a new frequency band, is being introduced. In the frequency overlay technique, previously used multiple FAs are simultaneously used to support a required new FA. For example, in a state where two FAs of 10 MHz are previously used, a service using an FA of 20 MHz can be provided without additional frequency allocation when the two FAs of 10 MHz are subjected to a frequency overlay process.

Therefore, in consideration of the introduction of the frequency overlay technique using multiple FAs, there is a need for a technique which distributes packets by using the multiple FAs and which supports QoS, in order to maintain a compatibility with the communication system.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for supporting multiple Frequency Allocations (FAs) in a wideband wireless communication system.

Another aspect of the present invention is to provide an apparatus and method for supporting Quality of Service (QoS) in a wideband wireless communication system supporting multiple FAs.

Another aspect of the present invention is to provide an apparatus and method for distributing packets, which are received from a superordinate layer, through multiple FAs in a wideband wireless communication system.

According to an aspect of the present invention, a transmitting method for packet distribution in a wideband wireless communication system is provided. The method includes, during a network entry process, determining a number of FAs through multi-FA capability negotiation; distributing packets, received from a superordinate layer, through the multiple FAs; and transmitting the packets distributed through the multiple FAs.

According to another aspect of the present invention, a method of supporting QoS in a wideband wireless communication system using multiple FAs is provided. The method includes determining a number of connected multiple FAs; setting QoS parameters for a Service Flow (SF) according to the number of connected multiple FAs; and transmitting a message including the QoS parameter set for the multiple FAs.

According to another aspect of the present invention, a transmitting apparatus for packet distribution in a wideband wireless communication system is provided. The apparatus includes a multi-FA controller for determining a number of FAs, through multi-FA capability negotiation, during a network entry process; a packet distributor for distributing packets, received from a superordinate layer, through the multiple FAs; and a Media Access Control (MAC) processor for transmitting the packets distributed through the multiple FAs.

According to another aspect of the present invention, an apparatus for supporting QoS in a wideband wireless communication system using multiple FAs is provided. The apparatus includes a multi-FA controller for determining a number of connected multiple FAs; a QoS unit for setting QoS parameters for an SF according to the number of connected multiple FAs; and a MAC processor for transmitting a message including the QoS parameter set for the multiple FAs.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

The present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, an apparatus and method for supporting packet distribution and Quality of Service (QoS) in a wideband wireless communication system using multiple Frequency Allocations (FAs) will be described.

Although a wireless communication system using Orthogonal Frequency Division Multiplexing (OFDM) will be described as an example in the following descriptions, the present invention may also apply to other wireless communication systems using different access methods such as Code Division Multiple Access (CDMA).

Figure 1:
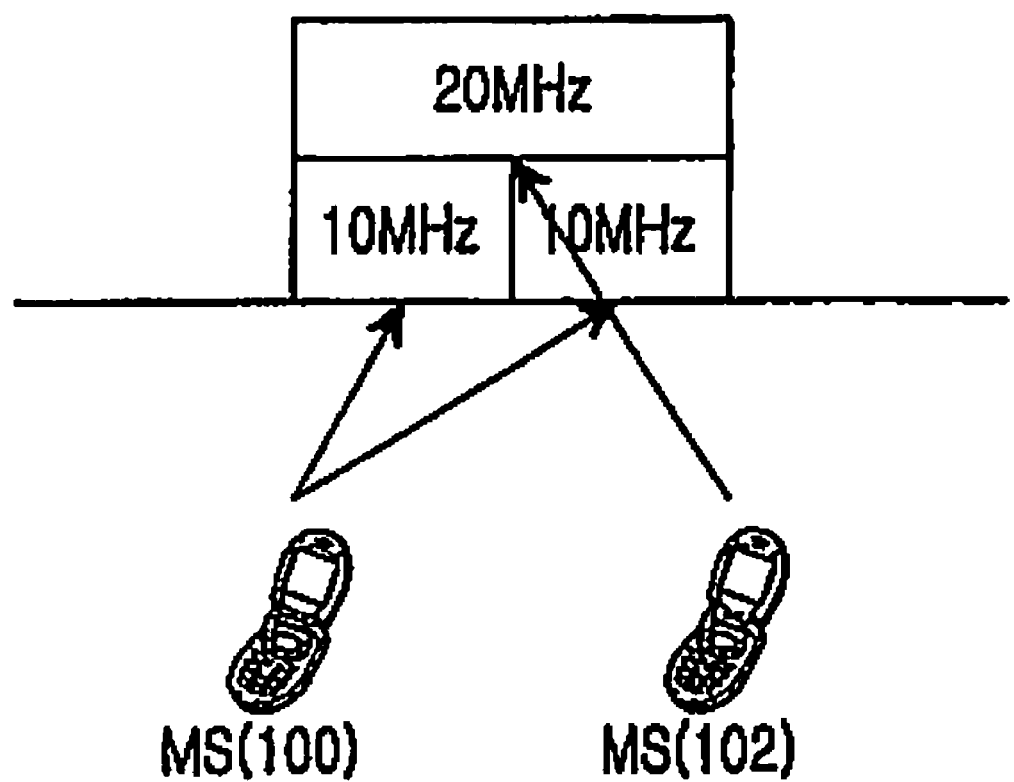
FIG. 1 illustrates an example of a frequency overlay scheme using multiple Frequency Allocations (FAs) in a wideband wireless communication system according to the present invention.

FIG. 1 illustrates an example of a frequency overlay scheme using multiple FAs in a wideband wireless communication system according to the present invention.

Referring to FIG. 1, a Base Station (BS) supports two FAs, i.e., FA#1 and FA#2, each having a bandwidth of 10 MHz, and provides a service to a plurality of Mobile Stations (MSs) 100 and 102. Although the number of FAs is assumed herein to two for convenience, the BS may support two or more FAs. The MS 100 is a legacy MS and uses one FA having a bandwidth of 10 MHz at one time. The MS 102 is a new MS and simultaneously uses two FAs each having a bandwidth of 10 MHz. That is, the MS 102 maintains two connections through the two FAs, and thus performs communication by using a bandwidth of 20 MHz. As such, by using the frequency overlay scheme, the BS can provide the service both to the new MS and the legacy MS. Further, since the two FAs are independently managed, similarly to the legacy MS, the MS 102 may optionally perform communication by using only one FA.

The MS 102 uses the bandwidth of 20 MHz through frequency overlay according to the following procedure. First, the MS 102 performs an initial network entry process to establish a connection to FA#1, and performs multi-FA capability negotiation. Upon completing the network entry process on FA#1, a connection to FA#1 is established, and at the same time, whether multi-FA is supported can be determined. Thereafter, when a multi-FA operation is needed, the MS 102 performs a network entry process on FA#2, in which FA#1 is not being used. Upon completing the network entry process on FA#2, the two FAs are allocated to the MS 102, and the MS 102 can perform a frequency overlay function. When the MS 102 must change its operation mode from a multi-FA mode, in which two FAs are allocated, to a single-FA mode, in which one FA is allocated, connection re-registration is performed on a suitable FA between FA#1 and FA#2. In order to ensure a QoS, a QoS negotiation process is re-performed on all connections when the operation mode changes from the single-FA mode to the multi-FA mode or vice versa.

A protocol stack structure for supporting frequency overlay by using multiple FAs will now be described with reference to FIG. 2.

Figure 2:
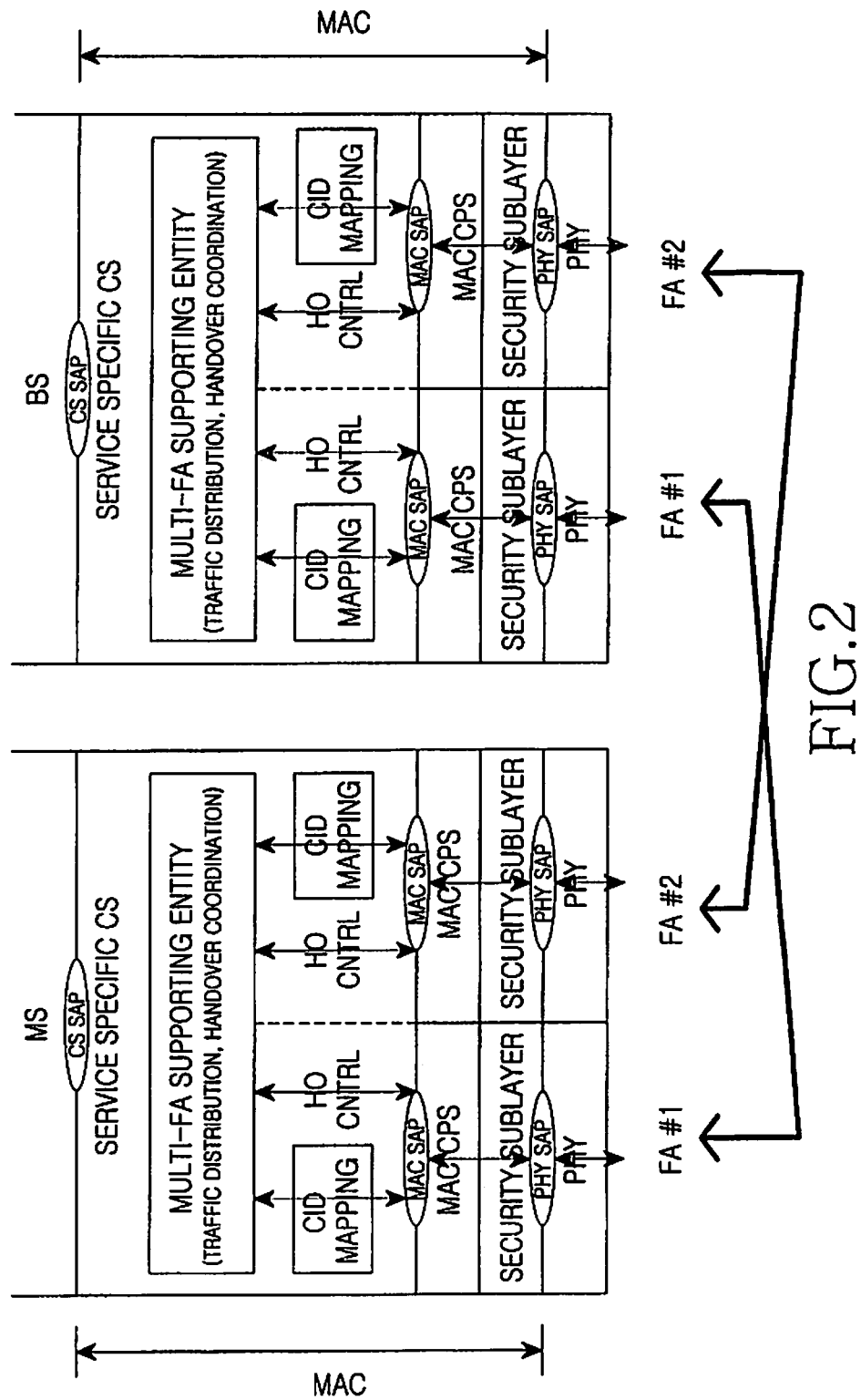
FIG. 2 illustrates a protocol stack structure for supporting multiple FAs according to the present invention.

Referring to FIG. 2, the protocol stack structure using the multiple FAs includes a PHYsical (PHY) layer and a Media Access Control (MAC) layer. The MAC layer includes a security sublayer, a MAC-Common Part Sublayer (CPS), and a Convergence Sublayer (CS). Basically, two PHY layers and two MAC layers exit to support two FAs. A Multi-FA Supporting Entity (MFSE) is included in the CS to coordinate the multiple FAs. The location of the MFSE depicted in the figure is only an example, and thus the MFSE may exist in other layers (e.g., Internet Protocol (IP) layer).

Now functions of the respective layers will be described in brief. A service specific CS converts or maps external network data, which is received through a CS Service Access Point (SAP), into MAC Service Data Units (SDUs) which are received by the MAC-CPS. Herein, a variety of protocol interfaces are provided including a function that relates a MAC Service Flow IDentifier (SFID) to a Connection IDentifier (CID) by distinguishing Packet Data Units (PDUs) of an external network. For example, the CS converts data to conform to a MAC protocol of an application such as a digital audio/video multicast, a digital telephone, and an Internet access application.

The MAC-CPS controls access to shared wireless media, and also controls flows of data and control signals according to a defined MAC protocol. For example, the MAC-CPS provides a core MAC function (e.g., a system access, bandwidth allocation, connection setting, and connection maintenance) and receives data, which is classified by using a specific MAC access method, from the CS through the MAC SAP. Further, the MAC-CPS forms a MAC PDU and a burst by using the MAC SDUs provided from the CS and delivers the formed data to its subordinate layer. Furthermore, the MAC-CPS extracts the MAC-SDUs from the data received from the subordinate layer and delivers the resultant data to the CS.

The security sublayer provides an authentication function, a secure key exchange function, and an encryption function.

The PHY layer performs coding, modulation, Inverse Fast Fourier Transform (IFFT), and Radio Frequency (RF) modulation on the burst formed in the MAC-CPS so that the burst can be transmitted in practice. Then, the PHY layer transmits the resultant data through a wireless link. Further, the PHY layer performs RF demodulation, Fast Fourier Transform (FFT), demodulation, and decoding on a signal received through the wireless link, and delivers the received data to the MAC-CPS' superordinate layer.

The MFSE performs multi-FA capability negotiation to know whether multi-FA is supported between a Mobile Station (MS) and a BS. Further, the MFSE distributes packets, which are delivered from the superordinate layer (e.g., IP layer), through the respective multiple FAs, and gathers and integrates packets delivered from the subordinate layer. During handover, the MFSE performs a handover coordination function so that a handover to a target BS, simultaneously for all connections established to the same MS in multi-FA communication, can be performed. Details of a packet distribution policy will be described below in detail with reference to FIGS. 5A and 5B.

When the operation mode changes from the multi-FA mode to the single-FA mode, the MFSE performs connection re-registration on a suitable FA between FA#1 and FA#2. In addition, when the operation mode changes from the signal-FA mode to the multi-FA mode or vice versa, the MFSE re-performs a QoS negotiation process (e.g., Dynamic Service Addition (DSA), Dynamic Service Change (DSC), etc.) on all connections in order to ensure a QoS. Details of the QoS negotiation process will be described below in detail with reference to FIG. 6.

The CID mapping function of the CS, the MAC-CPS function, the function of the security sublayer, and the function of the PHY layer are independently performed with one another. Further, a plurality of MAC-CPSs corresponding to the multiple FAs exchange a handover-related signal with the MFSE in an independent manner.

Now, a packet distribution method and a QoS parameter setting method, when multiple FAs are used in a DownLink (DL) scenario where data is transmitted from a BS to an MS, with reference to FIG. 3A to FIG. 8 will be described. The same may also apply to an UpLink (UL) scenario. Since the packet distribution method and the QoS parameter setting method in the UL scenario are similar to those in the DL scenario, descriptions thereof will be omitted. That is, although the packet distribution method and the QoS parameter setting method are performed by the BS, these methods are also performed by the MS in the same manner.

Figure 3A:
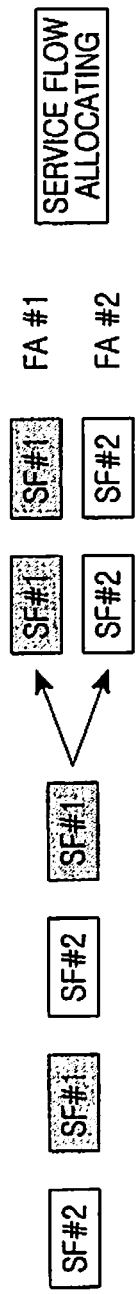
FIGS. 3A, 3B, and 3C illustrate examples of a packet distribution method when an Internet Protocol (IP) packet is connected using multiple FAs in a Base Station (BS) (or a Mobile Station (MS)) according to the present invention.
Figure 3B:
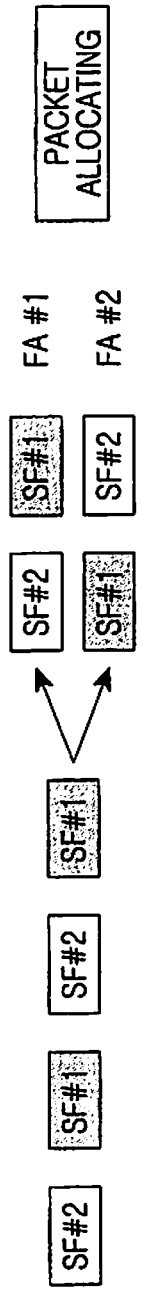
Figure 3C:
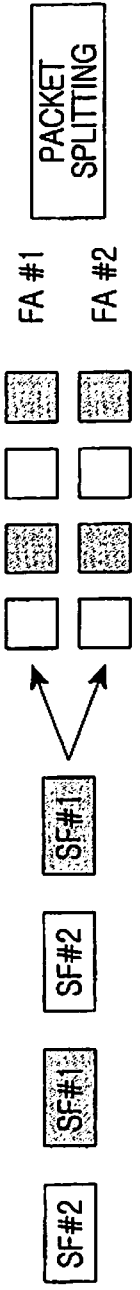

FIGS. 3A, 3B and 3C illustrate examples of a packet distribution method when an IP packet is connected using multiple FAs in a BS (or MS) according to the present invention.

Referring to FIGS. 3A to 3C, the packet distribution method may be classified into three methods: a Service Flow Allocating (SFA) method, a Packet Allocating (PA) method, and a Packet Splitting (PS) method. For convenience, it will be assumed that the BS is connected through two FAs, i.e., FA#1 and FA#2, by performing multi-FA capability negotiation and has two DL Service Flows (SFs), i.e., SF#1 and SF#2. Examples of the SFs include an Unsolicited Grant Service (UGS), a real time Polling Service (rtPS), a non-real-time Polling Service (nrtPS), and a Best Effort (BE) service.

FIG. 3A shows the SFA method in which one SF is allocated to only one FA. For example, when providing a service, SF#1 and SF#2, each of which is an SF of an IP packet transmitted from a superordinate layer (e.g., IP layer), are respectively connected to FA#1 and FA#2. Alternatively, when providing the service, SF#1 may be connected to FA#2, and SF#2 may be connected to FA#1. As such, since the SFA method allocates each SF to only one FA, all QoS parameters for the SFs are the same as those of a specific SF in association with each FA. Therefore, there is no need to modify the settings of the QoS parameters when the multiple FAs are used.

FIG. 3B shows the PA method in which each SF is mapped to multiple FAs, wherein a mapping unit is a packet unit. In other words, a service is provided in such a manner that one SF is scheduled to the connected multiple FAs without packet fragmentation under the control of the MFSE of the BS. In this case, if a specific SF requires a QoS having a minimum rate of 10 Mbps and a packet interval of 20 ms in a multi-FA communication, the PA method sets a QoS having a minimum rate of 5 Mbps and a packet interval of 40 ms for each FS. Since each SF is divided to connected with two FAs, i.e., FA#1 and FA#2, QoS parameters for the divided SFs do not coincide with each other. The PA method has a merit in that the MFSE does not have to fragment a packet in order to transmit the packet to several FAs. In addition, since the multiple FAs are simultaneously used, there is an advantage in that a multiplexing gain is higher than a multiplexing gain resulting from the SFA method.

FIG. 3C shows the PS method in which a packet transmitted from a superordinate layer (e.g., IP layer) is fragmented according to a predetermined rule, and is fragmented and transmitted through multiple FAs. For example, when a packet needs to be transmitted through two FAs, the PS method fragments one packet into two packets and transmits the fragmented packets through FA#1 and FA#2, respectively. Similar to the PA method, the PS method also sets QoS parameters according to the number of connected multiple FAs. The PS method has an advantage in that a multiplexing gain is high in comparison with the aforementioned two methods (i.e., SFA and PA).

Figure 4:
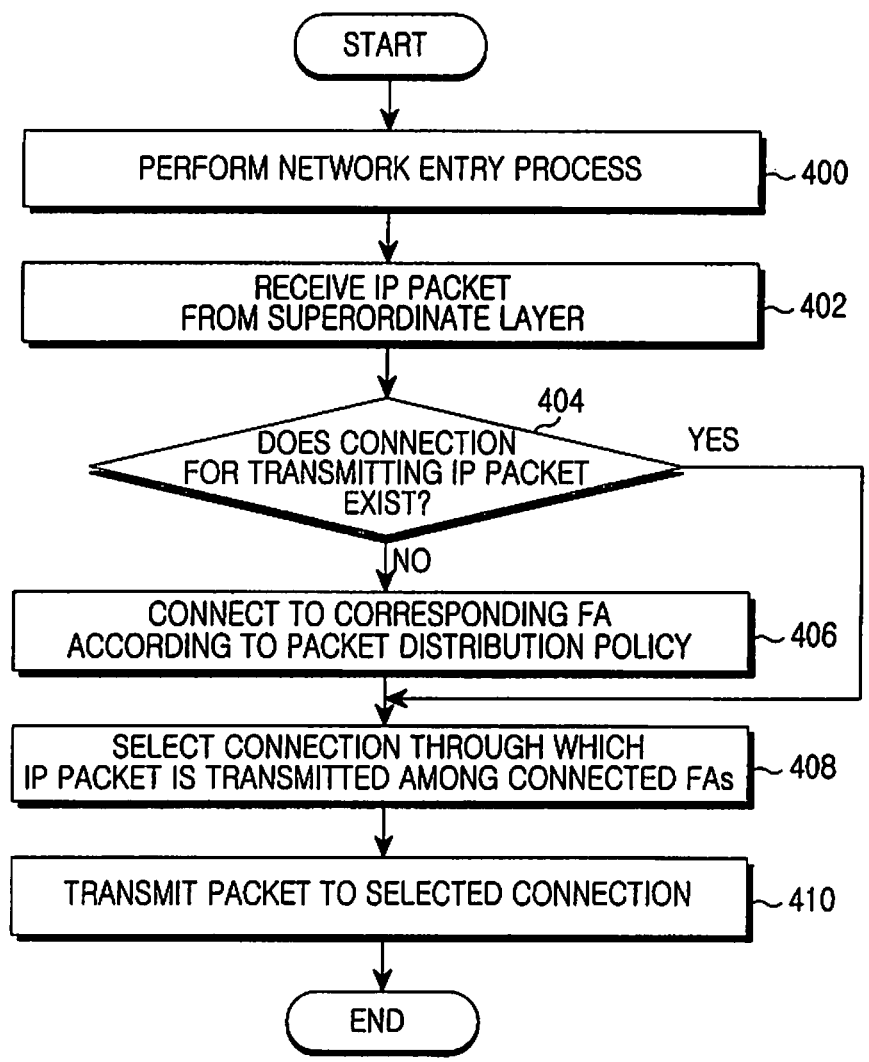
FIG. 4 is a flowchart illustrating a packet distribution process performed by a BS in a wideband wireless communication system using multiple FAs according to the present invention.

FIG. 4 is a flowchart illustrating a packet distribution process performed by a BS in a wideband wireless communication system using multiple FAs according to the present invention.

Referring to FIG. 4, the BS registers an MS by performing a network entry process in step 400. In the network entry process, a connection for an SF is established between the BS and the MS through FA#1, and whether multi-FA is supported can be determined. When a multi-FA operation is required, the BS and the MS perform the network entry process on FA#2 in which FA#1 is not being used. Upon completing the network entry process on FA#2, the two FAs are allocated to the MS, and the MS can perform a frequency overlay function.

In step 402, the BS receives from a superordinate layer an IP packet to be transmitted to the MS.

In step 404, the BS determines whether a connection for transmitting the IP packet exists. If the IP packet does not exist, the BS connects to a specific FA according to a packet distribution policy in step 406. Otherwise, if the IP packet exists, the procedure proceeds to step 408. The packet distribution policy is one of methods shown in FIG. 3A, FIG. 3B, and FIG. 3C. Details of the packet distributions of FIG. 3A, FIG. 3B, and FIG. 3C are respectively shown in FIG. 5A, FIG. 5B, and FIG. 5C.

In step 408, the BS selects a connection, through which the IP packet is transmitted, from among connected FAs. For example, in the case of FIG. 3A, the BS selects a connection of an FA to which one SF is connected in a one-to-one manner. In the case of FIG. 3B, the BS selects a connection of an FA through which the IP packet is distributed by connecting one SF to multiple FAs. In the case of FIG. 3C, the BS selects a connection of an FA through which fragmented packets are distributed by fragmenting the IP packet.

In step 410, the BS transmits the IP packet through the selected connection. For example, in the case of FIG. 3A, the BS transmits IP packets through the multiple FAs, which are one-to-one mapped to the respective SFs. In the case of FIG. 3B, the BS transmits the IP packets by mapping one SF to the multiple FAs. In the case of FIG. 3C, the BS fragments a specific IP packet into several packets and then transmits the fragmented packets through the connected multiple FAs.

Thereafter, the procedure of FIG. 4 ends.

Figure 5A:
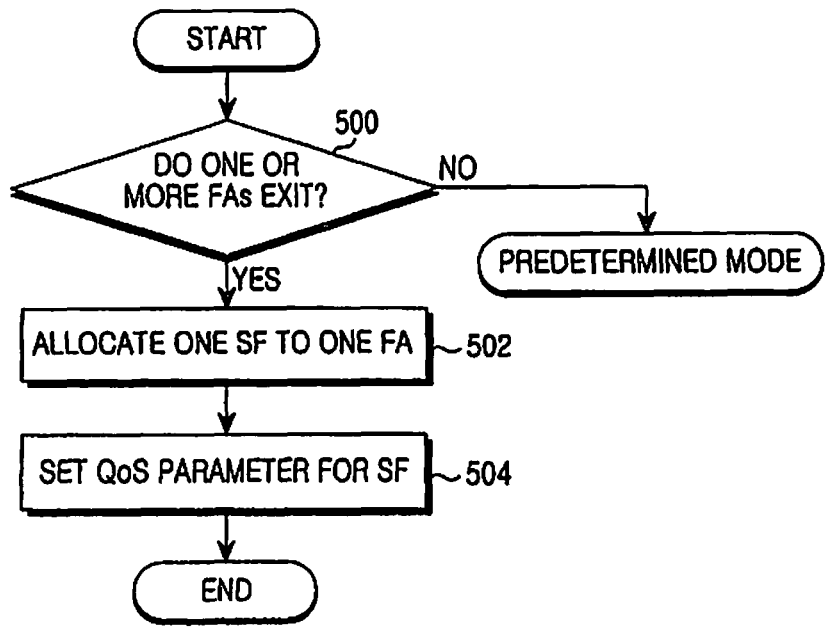
FIGS. 5A, 5B and 5C are flowcharts illustrating an IP packet distribution process in a wideband wireless communication system according to the present invention.
Figure 5B:
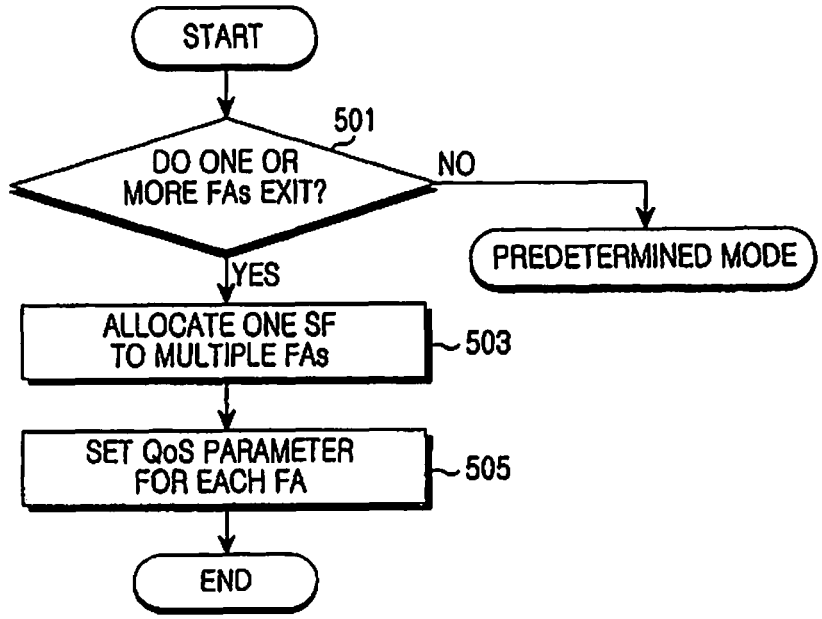
Figure 5C:
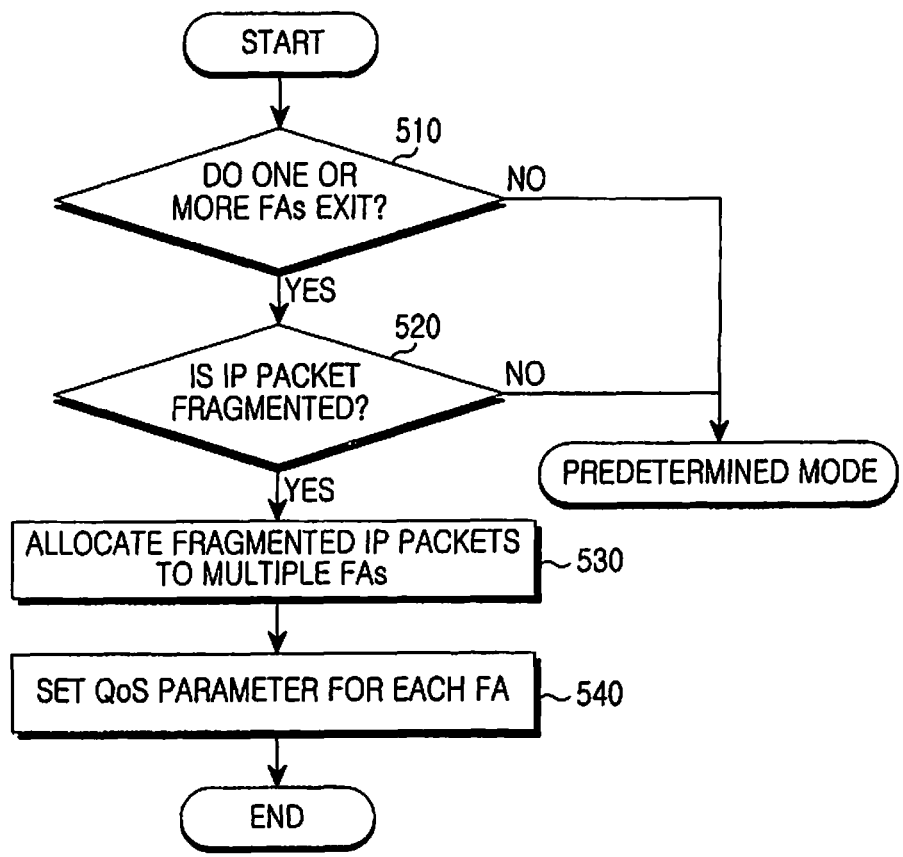

FIGS. 5A, 5B, and 5C are flowcharts illustrating an IP packet distribution process in a wideband wireless communication system according to the present invention.

Referring to FIG. 5A, a BS determines whether one or more FAs exist in step 500. If one or more FAs exist, the BS allocates one SF to only one FA (see FIG. 3A) in step 502. If no FA exists, the BS enters into a predetermined mode.

In step 504, the BS sets QoS parameters for the SF. The QoS parameters are set according to the number of connected multiple FAs and a packet distribution policy. Details thereof will be described below with reference to FIG. 6.

Thereafter, the procedure of FIG. 5A ends.

Referring to FIG. 5B, the BS determines whether one or more FAs exist in step 501. If one or more FAs exist, without fragmenting the IP packet, the BS allocates one SF to the multiple FAs (see FIG. 3B) in step 503.

If no FA exists, the BS enters into a predetermined mode.

In step 505, the BS sets QoS parameters for the SF. The QoS parameters are set according to the number of connected multiple FAs and a packet distribution policy. Details thereof will be described below with reference to FIG. 6.

Thereafter, the procedure of FIG. 5B ends.

Referring to FIG. 5C, the BS determines whether one or more FAs exist in step 510. If one or more FAs exist, the BS determines whether the IP packet is fragmented in step 520. If the IP packet is fragmented, the BS respectively allocates the fragmented IP packets to the multiple FAs in step 530 (see FIG. 3C).

If no FA exists, the BS enters into a predetermined mode.

In step 540, the BS sets QoS parameters for the SF. The QoS parameters are set according to the number of connected multiple FAs and a packet distribution policy. Details thereof will be described below with reference to FIG. 6.

Thereafter, the procedure of FIG. 5C ends.

Although the procedure has been described in FIG. 4 and FIGS. 5A to 5C that the BS is used as an example, the same procedure also applies to an MS.

Figure 6:
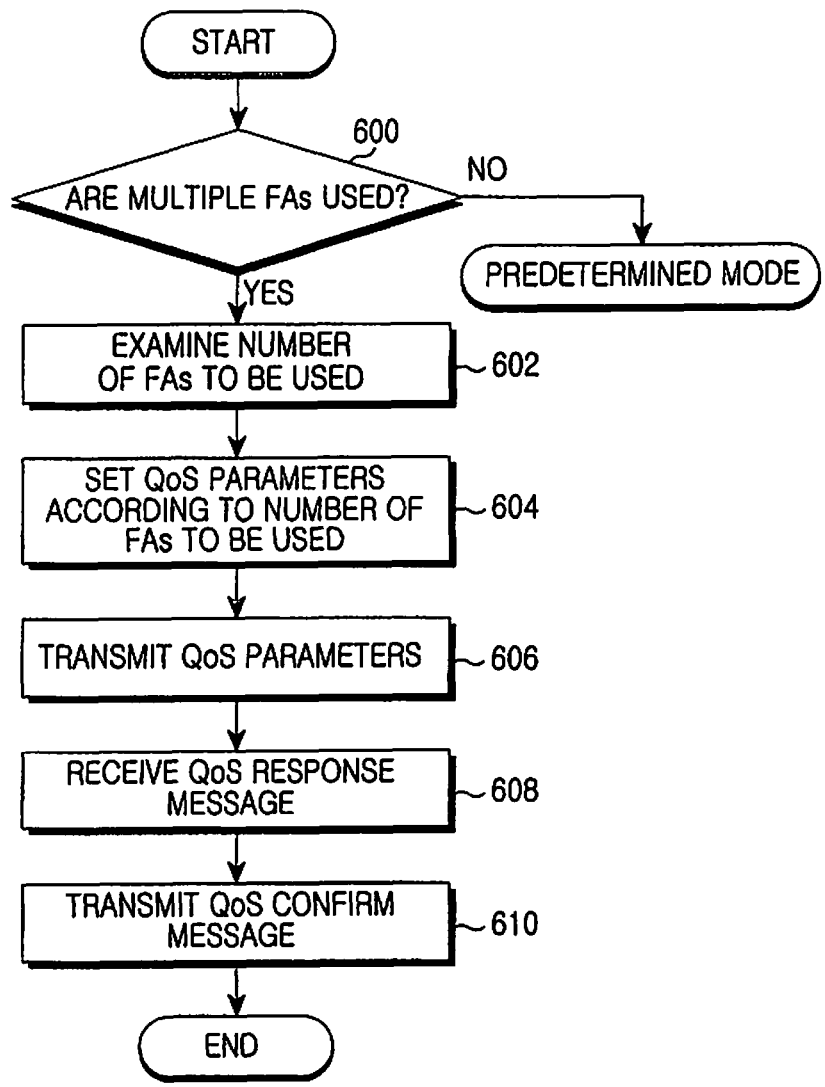
FIG. 6 is a flowchart illustrating a Quality of Service (QoS) parameter setting process for supporting multiple FAs according to the present invention.

FIG. 6 is a flowchart illustrating a QoS parameter setting process for supporting multiple FAs according to the present invention.

Referring to FIG. 6, when the multiple FAs are used in step 600, a BS examines the number of connected FAs in step 602.

If multiple FAs are not used (i.e., only one FA is used), the BS operates in a predetermined mode. Table 1 below shows the settings of QoS parameters according to a service class of a wideband wireless communication system (i.e., an Institute of Electrical and Electronics Engineers (IEEE) 802.16e) in the predetermined mode.

TABLE 1

| Service Classes | UGS | RTPS | NRTPS | BE |
|---|---|---|---|---|
| Service Characteristics | To support Real-time applications generating fixed-rate data | To support real-time applications with variable data rate which require guaranteed data rate and delay | To support real-time data applications with variable bit rate which require guaranteed data rate and delay | To support applications that require a guaranteed data rate but are insensitive to delays | To support applications with no rate or delay requirements |
| Applications | TI/EI, VoIP without silence suppression | VoIP with silence suppression | MPEG video | FTP | — |
| Mandatory QoS Service Flow Parameters | Tolerated Jitter SDU size (if fixed length SDU) Minimum Reserved Traffic Rate Maximum Latency Request/ Transmission Policy Unsolicited Grant Interval | Maximum Latency Tolerated Jitter Minimum Reserved Traffic Rate Maximum Sustained Traffic Rate Traffic Priority Request/ Transmission Policy Unsolicited Grant Interval | Maximum Latency Minimum Reserved Traffic Rate Maximum Sustained Traffic Rate (Optional) Traffic Priority Request/ Transmission Policy | Minimum Reserved Traffic Rate Maximum Sustained Traffic Rate (Optional) Traffic Priority Request/ Transmission Policy | Maximum Sustained Traffic Rate Traffic Priority Request/ Transmission Policy |

The wideband wireless communication system supports four service classes, that is, UGS, rtPS, nrtPS, and BE.

The UGS is an SF that supports a real-time data stream composed of fixed-sized data packets (e.g., T1/E1 Voice over IP (VoIP) without silence suppression) generated at a periodic interval. Examples of mandatory QoS SF parameters for the UGS include a maximum sustained traffic rate, a maximum latency, a tolerated jitter, a request/transmission policy, a minimum reserved traffic rate, an unsolicited grant interval, and an SDU size.

The rtPS is an SF that supports a real-time data stream composed of variable-sized data packets (e.g., Moving Pictures Exports Group (MPEC) video) generated at a periodic interval. Examples of mandatory QoS SF parameters for the rtPS include a maximum sustained traffic rate, a maximum latency, a tolerated jitter, a request/transmission policy, a minimum reserved traffic rate, an unsolicited grant interval, and a traffic priority.

The nrtPS is an SF that supports a delay-tolerant data stream composed of variable-sized data packets (e.g., File Transfer Protocol (FTP)), which require a minimum data rate. Examples of mandatory QoS SF parameters for the nrtPS include a maximum sustained traffic rate, a maximum latency, a request/transmission policy, a minimum reserved traffic rate, and a traffic priority.

The BE service is designed to support a data stream which does not require a minimum service level. Examples of mandatory QoS SF parameters thereof include a maximum sustained traffic rate, a traffic priority, and a request/transmission policy.

In step 604, the BS sets QoS parameters according to the number of connected FAs and a packet distribution policy. For example, if two FAs are used, the QoS parameters are set as shown in Table 2 below. Among the QoS parameters shown in Table 1 above, the minimum reserved traffic rate, the maximum sustained traffic rate, and the unsolicited grant interval are modified when an SF is distributed through multiple FAs.

Table 2 below shows the settings of the QoS parameters when two SFs are connected to two FAs.

When the packets are distributed for the two SFs by using Packet Splitting (PS), the SDU size, the minimum reserved traffic rate, and the maximum sustained traffic rate are halved, and the unsolicited grant interval does not change.

In step 606, the BS transmits to an MS a Dynamic Service Addition REQuest (DSA-REQ) message including the QoS parameters, which are set according to the number of connected FAs and a packet distribution policy.

In step 608, the BS receives a Dynamic Service Addition ReSPonse (DSA-RSP) message from the MS in response to the DSA-REQ message.

In step 610, the BS transmits a Dynamic Service Addition ACKnowledge (DSA-ACK) message to the MS in response to the DSA-RSP message.

Thereafter, the procedure of FIG. 6 ends.

Figure 7:
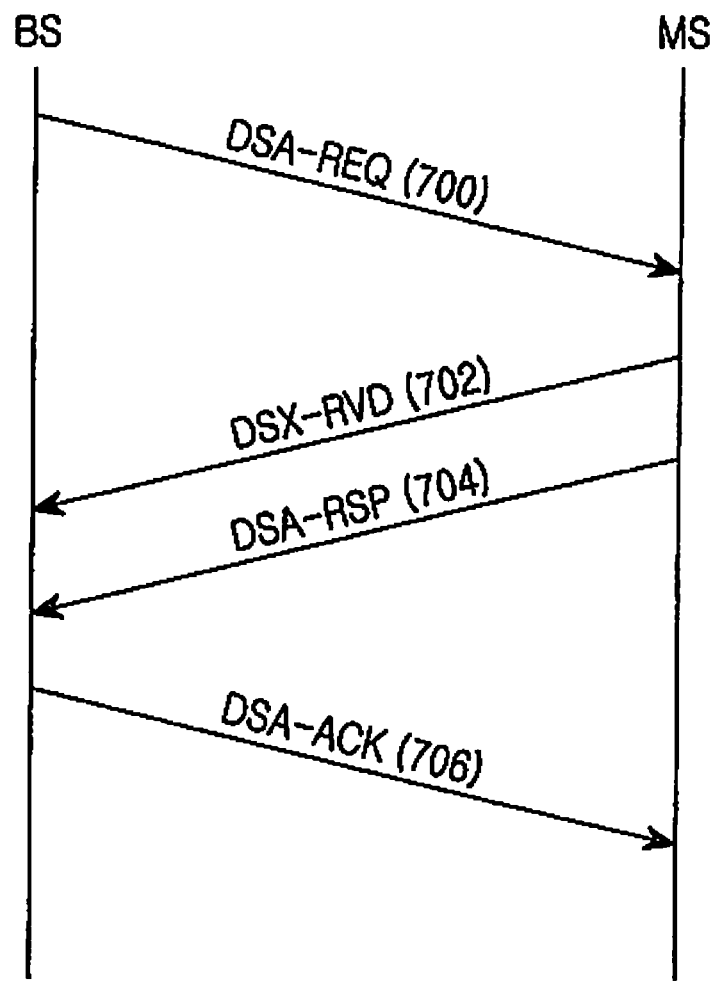
FIG. 7 is a flowchart illustrating a Service Flow (SF) generation process initiated by a BS in a wideband wireless communication system according to the present invention.

FIG. 7 is a flowchart illustrating an SF generation process initiated by a BS in a wideband wireless communication system according to the present invention.

Referring to FIG. 7, the BS transmits to an MS a DSA-REQ message including QoS parameters that are set according to the number of connected FAs and a packet distribution policy in step 700.

In steps 702 and 704, the MS transmits to the BS a DSx ReceiVeD (DSX-RVD) message and a DSA-RSP message in response to the DSA-REQ message.

In step 706, the BS transmits to the MS a DSA-ACK message in response to the DSA-RSP.

Thereafter, the procedure of FIG. 7 ends.

TABLE 2

| Scheduling Type | UGS | RTPS | NRTPS | BE |
|---|---|---|---|---|
| Service Flow Allocating | No changing | No changing | No changing | No changing | No changing |
| Packet Allocating | Minimum Reserved Traffic Rate/2 Unsolicited Grant Interval*2 | Minimum Reserved Traffic Rate/2 Maximum Sustained Traffic Rate/2 Unsolicited Grant Interval*2 | Minimum Reserved Traffic Rate/2 Maximum Sustained Traffic Rate/2 (Optional) | Minimum Reserved Traffic Rate/2 Maximum Sustained Traffic Rate/2 (Optional) | Maximum Sustained Traffic Rate/2 |
| Packet Splitting | SDU size/2 (if fixed length SDU) Minimum Reserved Traffic Rate/2 Unsolicited Grant Interval | Minimum Reserved Traffic Rate/2 Maximum Sustained Traffic Rate/2 Unsolicited Grant Interval | Minimum Reserved Traffic Rate/2 Maximum Sustained Traffic Rate/2 (Optional) | Minimum Reserved Traffic Rate/2 Maximum Sustained Traffic Rate/2 (Optional) | Maximum Sustained Traffic Rate/2 |

For example, when packets are distributed for two SFs by using Service Flow Allocating (SFA), there is no change in the QoS parameters for each SF. This is because all QoS parameters for the SFs are the same as those of a specific SF in association with each FA.

When the packets are distributed for the two SFs by using Packet Allocating (PA), the minimum reserved traffic rate and the maximum sustained traffic rate are halved, and the unsolicited grant interval is doubled. The reason above is that, since one SF is divided to be connected to two FAs, i.e., FA#1 and FA#2, QoS parameters for the divided SFs do not coincide with each other.

Figure 8:
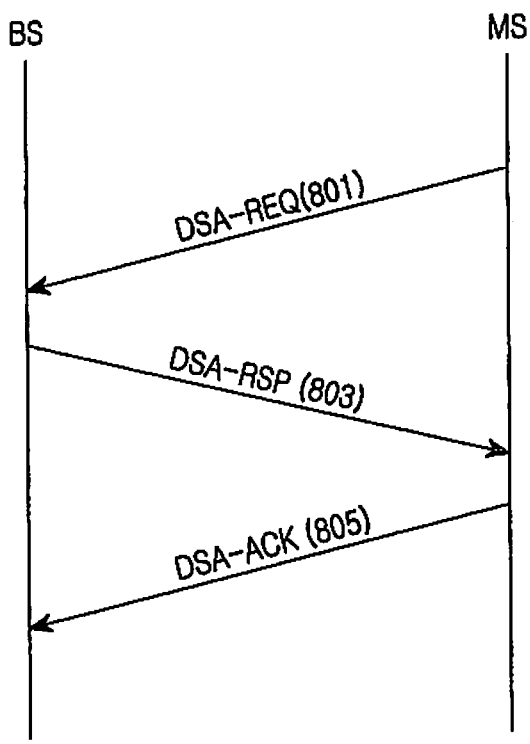
FIG. 8 is a flowchart illustrating an SF generation process initiated by an MS in a wideband wireless communication system according to the present invention.

FIG. 8 is a flowchart illustrating an SF generation process initiated by an MS in a wideband wireless communication system according to the present invention.

Referring to FIG. 8, the MS transmits to a BS a DSA-REQ message including QoS parameters that are set according to the number of connected FAs and a packet distribution policy in step 801.

In step 803, the BS transmits to the MS a DSA-RSP message in response to the DSA-RSP message.

In step 805, the MS transmits to the BS a DSA-ACK message in response to the DSA-RSP message.

Thereafter, the procedure of FIG. 8 ends.

Figure 9:
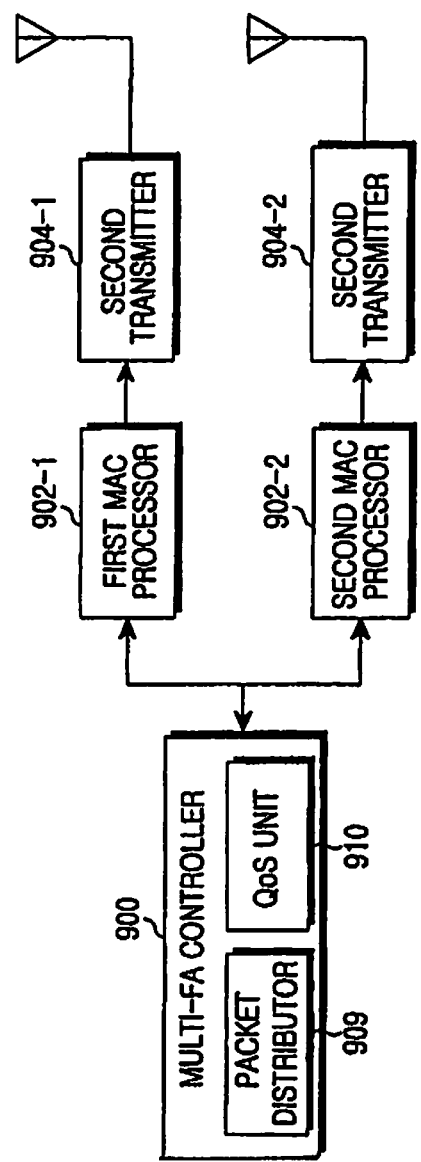
FIG. 9 is a block diagram of a transmitting apparatus supporting multiple FAs in a wideband wireless communication system according to the present invention.

FIG. 9 is a block diagram of a transmitting apparatus supporting multiple FAs in a wideband wireless communication system according to the present invention.

Referring to FIG. 9, under the assumption that the number of FAs is 2, the transmitting apparatus includes a multi-FA controller 900, a first MAC processor 902-1, a second MAC processor 902-2, a first transmitter 904-1, and a second transmitter 904-2. The multi-FA controller 900, the first MAC processor 902-1, and the second MAC processor 902-2 belong to the MAC layer of FIG. 2. The first transmitter 904-1 and the second transmitter 904-2 belong to the PHY layer of FIG. 2.

A transmission operation will be explained first. The multi-FA controller 900 controls distribution of packets through the multiple FAs and to sets QoS parameters. The multi-FA controller 900 includes a packet distributor 909 and a QoS unit 910. The packet distributor 909 receives the packets from a superordinate layer (e.g., IP layer) and distributes the packets to the first MAC processor 902-1 and the second MAC processor 902-2 according to a predetermined rule. The distributed PDUs may be traffic data for one SF or traffic data for a plurality of SFs. The packet distributor 909 may equally or unequally distribute the PDUs according to a state (e.g., load state) of each FA. Details of the packet distribution have been described above with reference to FIGS. 3A to 3C.

The QoS unit 910 sets the QoS parameters (see FIG. 6) according to the number of connected FAs and a packet distribution policy (see FIGS. 3A to 3C), and provides the QoS parameters to the first MAC processor 902-1 and the second MAC processor 902-2.

The first MAC processor 902-1 generates MAC PDUs by appending a header and an error checking code (i.e., Cyclic Redundancy Check (CRC)) to each of PDUs received from the multi-FA controller 900, forms frame data by sorting the generated MAC PUDs, and transmits the frame data to the PHY layer. For the same SF, a Connection ID (CID) recorded to the MAC PDU by the first MAC processor 902-1 is different from a CID recorded to the MAC PDU by the second MAC processor 902-2. Further, the first MAC processor 902-1 performs a function for generating and analyzing a MAC layer control message (i.e., a signaling message). For example, when an SF is generated or modified, the first MAC processor 902-1 generates and analyzes DSA and DSC messages including QoS parameters received from the QoS unit 910.

The second MAC processor 902-2 has a MAC address different from the MAC address of the first MAC processor 902-1, and performs the same reception process as the first MAC processor 902-1.

According to a predetermined rule, the first transmitter 904-1 performs a physical-layer encoding on data received from the corresponding first MAC processor 902-1. For example, the first transmitter 904-1 codes and modulates the data received from the first MAC processor 902-1 according to a predetermined Modulation & Coding Scheme (MCS) level, and performs OFDM modulation on the data by using Inverse Fast Fourier Transform (IFFT). Further, the first transmitter 904-1 converts baseband data into an analog signal, converts the baseband analog signal into an RF signal corresponding to one FA (e.g., FA#1) of the two FAs for multi-FA communication, and transmits the RF signal through an antenna. Such a process is provided in consideration of an OFDM system, thus, when using a CDMA system, the OFDM modulation may be replaced with code spreading modulation.

According to a predetermined rule, the second transmitter 904-2 performs a physical layer encoding on data received from the corresponding second MAC processor 902-2. In this case, the second MAC processor 902-2 converts a baseband signal into an RF signal corresponding to the other FA (e.g., FA#2) of the two FAs for multi-FA communication, and transmits the RF signal through an antenna.

Figure 10:
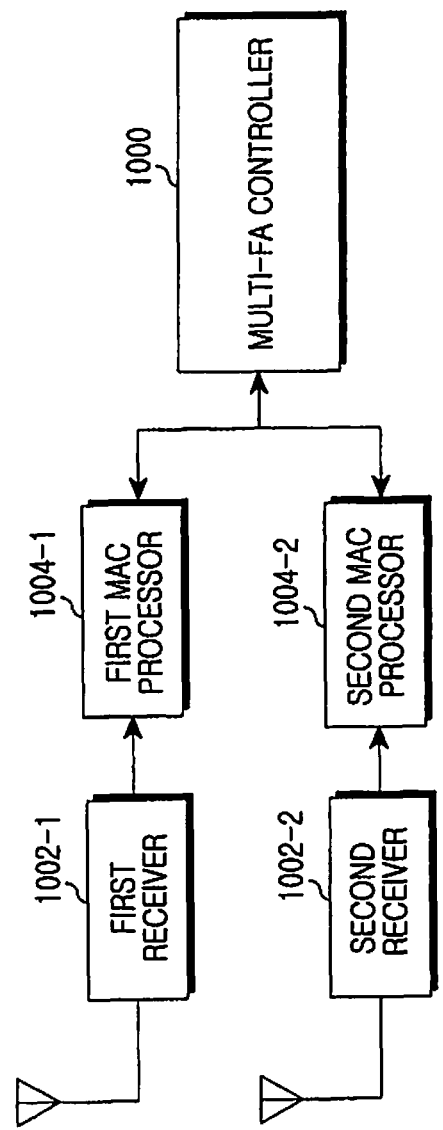
FIG. 10 is a block diagram illustrating a receiving apparatus supporting multiple FAs in a wideband wireless communication system according to the present invention.

FIG. 10 is a block diagram illustrating a receiving apparatus supporting multiple FAs in a wideband wireless communication system according to the present invention.

Referring to FIG. 10, under the assumption that the number of FAs is two, the receiving apparatus includes a multi-FA controller 1000, a first MAC processor 1004-1, a second MAC processor 1004-2, a first receiver 1002-1, and a second receiver 1002-2. The multi-FA controller 1000, the first MAC processor 1004-1, and the second MAC processor 1004-2 belong to the MAC layer of FIG. 2, and the first receiver 1002-1 and the second receiver 1002-2 belong to the PHY layer of FIG. 2.

The first receiver 1002-1 performs physical-layer decoding on a signal received through an antenna and then transmits the signal to the corresponding first MAC processor 1004-1. For example, the first MAC processor 1004-1 filters the signal received through the antenna to obtain a signal in association with FA#1, converts the obtained signal into baseband sample data, performs OFDM demodulation on the sample data, demodulates and decodes the OFDM-demodulated data according to a predetermined MSC level, and restores an information bit-steam.

The second receiver 1002-2 performs physical-layer decoding on a signal received through an antenna, and transmits the signal to the corresponding second MAC processor 1004-2. The second receiver 1002-2 filters the received signal to obtain a signal in association with FA#2, converts the obtained signal into a baseband signal, and transmits the baseband signal to the second MAC processor 1004-2.

The first MAC processor 1004-1 extracts a MAC PDU from data received from the corresponding first receiver 1002-1, and performs header and error checking on the extracted MAC PDU. In this case, if a control message (i.e., a signaling message) is determined as a result of the header checking, the first MAC processor 1004-1 performs a predetermined process, and if traffic is determined, the first MAC processor 1004-1 performs error checking and provides the error checking result to the multi-FA controller 1000. For example, when an SF is generated or modified, the first MAC processor 1004-1 receives DSA and DSC messages, including QoS parameters, and outputs the received messages to the multi-FA controller 1000. The second MAC processor 1004-2 has a MAC address different from the MAC address of the first MAC processor 1004-1, and performs the same reception process as the first MAC processor 1004-1.

The multi-FA controller 1000 receives the QoS parameters for multi-FA communication from the MAC processors 1004-1 and 1004-2 and provides control to maintain service quality. Further, the multi-FA controller 1000 gathers received data by using the multiple FAs and transmits the gathered data to a superordinate layer (e.g., IP layer). The multi-FA controller 1000 of the present invention controls multi-FA capability negotiation in order to check whether multi-FA is supported between an MS and a BS.

According to the present invention, packet distribution and QoS are provided when multi-FA is supported. Therefore, packets can be effectively distributed through multiple FAs, and QoS can be effectively provided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmitting method for packet distribution in a wireless communication system, the method comprising:
   determining, by a multi-Frequency Allocation (FA) controller, a number of Frequency Allocations (FAs) through multi-FA capability negotiation;
   distributing, by a packet distributor, packets of at least one Service Flow (SF), received from a superordinate layer, to the multiple FAs for a packet transmission, according to one of a service flow allocation, packet allocation and packet splitting; and
   transmitting, by a Media Access Control (MAC) processor, the packets distributed through the multiple FAs,
   wherein, when the packets of the at least of one SF are distributed to the multiple FAs, at least one of a minimum reserved traffic rate, a maximum sustained traffic rate, an unsolicited grant interval, and a Service Data Unit (SDU) size are modified according to the number of the FAs,
   wherein the minimum reserved traffic rate, the maximum sustained traffic rate, the unsolicited grant interval, and the SDU size are determined by a type of service class,
   wherein, when packets are distributed using Packet Allocating (PA) in which one SF is mapped to the multiple FAs without fragmenting the packets, the minimum reserved traffic rate decreases in proportion to the number of the connected multiple FAs and the unsolicited grant interval increases in proportion to the number of the connected multiple FAs,
   wherein, the SDU size and the minimum reserved traffic rate decrease in proportion to the number of connected multiple FAs, when packets are distributed using Packet Spitting (PS) in which the packets are fragmented and the fragmented packets are mapped to the connected multiple FAs.

2. The method of claim 1, wherein, in distributing the packets through the multiple FAs, the at least one SF and the multiple FAs are one-to-one mapped according to a predetermined rule.

3. The method of claim 1, wherein, in distributing the packets through the multiple FAs, one SF is mapped to the multiple FAs without fragmenting the packets.

4. The method of claim 1, wherein, in distributing the packets through the multiple FAs, the packets are fragmented, and the fragmented packets are mapped to the multiple FAs.

5. The method of claim 1, further comprising setting Quality of Service (QoS) parameters with respect to the multiple FAs.

6. A method of supporting Quality of Service (QoS) in a wireless communication system using multiple Frequency Allocations (FAs), the method comprising:
   determining, by a multi-FA controller, a number of connected multiple FAs; setting, by a QoS unit, QoS parameters for a Service Flow (SF) according to the number of the connected multiple FAs which are associated with one of a service flow allocation, packet allocation and packet splitting, for a packet transmission of the SF; and
   transmitting, by a Media Access Control (MAC) processor, a message including the QoS parameters set for the multiple FAs,
   wherein the QoS parameters comprise a minimum reserved traffic rate, a maximum sustained traffic rate, an unsolicited grant interval, and a Service Data Unit (SDU) size, and at least one of the minimum reserved traffic rate, a the maximum sustained traffic rate, the unsolicited grant interval, and the Service Data Unit (SDU) size are modified according to the number of the connected multiple FAs,
   wherein the minimum reserved traffic rate, the maximum sustained traffic rate, the unsolicited grant interval, and the SDU size are determined by a type of service class,
   wherein, when packets are distributed using Packet Allocating (PA) in which one SF is mapped to the multiple FAs without fragmenting the packets, the minimum reserved traffic rate decreases in proportion to the number of the connected multiple FAs and the unsolicited grant interval increases in proportion to the number of the connected multiple FAs,
   wherein, the SDU size and the minimum reserved traffic rate decrease in proportion to the number of connected multiple FAs, when packets are distributed using Packet Spitting (PS) in which the packets are fragmented and the fragmented packets are mapped to the connected multiple FAs.

7. The method of claim 6, further comprising receiving a QoS response message.

8. The method of claim 6, wherein, when the SF is generated, the message including the QoS parameter set is a Dynamic Service Addition (DSA) message, or, when the SF is modified, the message including the QoS parameter set is a Dynamic Service Change (DSC) message.

9. The method of claim 6, wherein when packets are distributed using Service Flow Allocating (SFA) in which SFs are one-to-one mapped to the multiple FAs according to a predetermined rule, the QoS parameters are not modified.

10. A transmitting apparatus for packet distribution in a wireless communication system, the apparatus comprising:
    a multi-FA controller for determining a number of Frequency Allocations (FAs), through multi-FA capability negotiation;
    a packet distributor for distributing packets of at least one Service Flow (SF), received from a superordinate layer, through the multiple FAs; and
    a Media Access Control (MAC) processor for transmitting the packets distributed to the multiple FAs for a packet transmission, according to one of a service flow allocation, packet allocation and packet splitting,
    wherein the packets of the at least of one SF are distributed to the multiple FAs when the multiple, at least one of a minimum reserved traffic rate, a maximum sustained traffic rate, an unsolicited grant interval, and a Service Data Unit (SDU) size are modified according to the number of the FA, and
    wherein the minimum reserved traffic rate, the maximum sustained traffic rate, the unsolicited grant interval, and the SDU size are determined by a type of service class,
    wherein, when packets are distributed using Packet Allocating (PA) in which one SF is mapped to the multiple FAs without fragmenting the packets, the minimum reserved traffic rate decreases in proportion to the number of the connected multiple FAs and the unsolicited grant interval increases in proportion to the number of the connected multiple FAs,
    wherein, the SDU size and the minimum reserved traffic rate decrease in proportion to the number of connected multiple FAs, when packets are distributed using Packet Spitting (PS) in which the packets are fragmented and the fragmented packets are mapped to the connected multiple FAs.

11. The apparatus of claim 10, wherein, when the packet distributor distributes the packets, the at least one SF and the multiple FAs are one-to-one mapped according to a predetermined rule.

12. The apparatus of claim 10, wherein, when the packet distributor distributes the packets through the multiple FAs, one SF is mapped to the multiple FAs without fragmenting the packets.

13. The apparatus of claim 10, wherein, when the packet distributor distributes the packets through the multiple FAs, the packets are fragmented, and the fragmented packets are mapped to the multiple FAs.

14. The apparatus of claim 10, further comprising a Quality of Service (QoS) unit for setting QoS parameters with respect to the multiple FAs.

15. An apparatus for supporting Quality of Service (QoS) in a wireless communication system using multiple Frequency Allocations (FAs), the apparatus comprising:
   a multi-FA controller for determining a number of connected multiple FAs;
   a QoS unit for setting QoS parameters for a Service Flow (SF) according to the number of connected multiple FAs which are associated with one of a service flow allocation, packet allocation and packet splitting, for a packet transmission of the SF; and
   a Media Access Control (MAC) processor for transmitting a message including the set QoS parameters set for the multiple FAs,
   wherein the QoS parameters comprise a minimum reserved traffic rate, a maximum sustained traffic rate, an unsolicited grant interval, and a Service Data Unit (SDU) size, and
   at least one of the minimum reserved traffic rate, the maximum sustained traffic rate, the unsolicited grant interval, and the Service Data Unit (SDU) size are modified according to the number of the connected multiple FAs, and
   wherein the minimum reserved traffic rate, the maximum sustained traffic rate, the unsolicited grant interval, and the SDU size are determined by a type of service class,
   wherein, when packets are distributed using Packet Allocating (PA) in which one SF is mapped to the multiple FAs without fragmenting the packets, the minimum reserved traffic rate decreases in proportion to the number of the connected multiple FAs and the unsolicited grant interval increases in proportion to the number of the connected multiple FAs,
   wherein, the SDU size and the minimum reserved traffic rate decrease in proportion to the number of connected multiple FAs, when packets are distributed using Packet Spitting (PS) in which the packets are fragmented and the fragmented packets are mapped to the connected multiple FAs.

16. The apparatus of claim 15, further comprising a receiver for receiving a QoS response message.

17. The apparatus of claim 15, wherein, when the SF is generated, the message including the set QoS parameters is a Dynamic Service Addition (DSA) message, or, when the SF is modified, the message including the set QoS parameters is a Dynamic Service Change (DSC) message.

18. The apparatus of claim 15, wherein when packets are distributed using Service Flow Allocating (SFA) in which SFs are one-to-one mapped to the multiple FAs according to a predetermined rule, the QoS parameters are not modified.

19. A transmitting method for packet distribution in a wireless communication system, the method comprising:
   performing, by a multi-FA controller, a first network entry process using a first Frequency Allocation (FA) and determining a number of FAs available;
   performing, by the multi-FA controller, a second network entry process using each of the determined FAs available;
   distributing, by a packet distributor, packets of at least one Service Flow (SF), received from a superordinate layer, to the FAs available for a packet transmission, according to one of a service flow allocating, packet allocation and packet splitting; and
   transmitting, by a Media Access Control (MAC) processor, the packets distributed through the multiple FAs,
   wherein the packets of the at least of one SF are distributed to the multiple FA when the multiple FA are used for a packet transmission, at least one of a minimum reserved traffic rate, a maximum sustained traffic rate, an unsolicited grant interval, and a Service Data Unit (SDU) size are modified according to the number of the FAs, and
   wherein the minimum reserved traffic rate, the maximum sustained traffic rate, the unsolicited grant interval, and the SDU size are determined by a type of service class,
   wherein, when packets are distributed using Packet Allocating (PA) in which one SF is mapped to the multiple FAs without fragmenting the packets, the minimum reserved traffic rate decreases in proportion to the number of the connected multiple FAs and the unsolicited grant interval increases in proportion to the number of the connected multiple FAs,
   wherein, the SDU size and the minimum reserved traffic rate decrease in proportion to the number of connected multiple FAs, when packets are distributed using Packet Spitting (PS) in which the packets are fragmented and the fragmented packets are mapped to the connected multiple FAs.

* * * * *